United States Patent
Woo

(10) Patent No.: US 8,644,593 B2
(45) Date of Patent: Feb. 4, 2014

(54) MOBILE TERMINAL AND 3D IMAGE COMPOSING METHOD THEREOF

(75) Inventor: Sungmin Woo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 13/230,645

(22) Filed: Sep. 12, 2011

(65) Prior Publication Data

US 2012/0063670 A1 Mar. 15, 2012

(30) Foreign Application Priority Data

Sep. 13, 2010 (KR) ........................ 10-2010-0089688

(51) Int. Cl.
*G06K 9/00* (2006.01)
*G06F 3/00* (2006.01)

(52) U.S. Cl.
USPC .......................................... 382/154; 715/700

(58) Field of Classification Search
USPC .......................................... 382/154; 715/700
See application file for complete search history.

(56) References Cited

U.S. PATENT DOCUMENTS

| | | | |
|---|---|---|---|
| 6,512,892 B1 * | 1/2003 | Montgomery et al. | 396/326 |
| 6,545,650 B1 * | 4/2003 | Yamada et al. | 345/7 |
| 8,228,327 B2 * | 7/2012 | Hendrickson et al. | 345/420 |
| 8,274,506 B1 * | 9/2012 | Rees | 345/419 |
| 8,436,893 B2 * | 5/2013 | McNamer et al. | 348/50 |
| 2008/0170812 A1 * | 7/2008 | Sun et al. | 382/305 |
| 2009/0284584 A1 * | 11/2009 | Wakabayashi et al. | 348/44 |
| 2011/0025825 A1 * | 2/2011 | McNamer et al. | 348/46 |
| 2011/0292178 A1 * | 12/2011 | Goma et al. | 348/46 |
| 2012/0002014 A1 * | 1/2012 | Walsh | 348/47 |

* cited by examiner

*Primary Examiner* — Utpal Shah
(74) *Attorney, Agent, or Firm* — Lee, Hong, Degerman, Kang & Waimey

(57) ABSTRACT

A mobile terminal and a method for composing 3D images thereof are disclosed. The method for composing 3D images of a mobile terminal includes: selecting a background image as a reference from an image buffer; adjusting a convergence point of the selected background image; extracting an object image to be composed to the background image; displaying guidance information indicating a position at which the object image can be composed to the background image; and composing the object image to the background image according to the guidance information. Thus, when 3D images, each having a different convergence, are composed, the convergence point of a background image is adjusted and guidance information indicating a position at which an object image is to be composed is provided, thereby conveniently and accurately composing the 3D images.

13 Claims, 8 Drawing Sheets

MOBILE TERMINAL AND 3D IMAGE COMPOSING METHOD THEREOF

CROSS REFERENCE TO RELATED APPLICATIONS

Pursuant to 35 U.S.C. §119(a), this application claims the benefit of earlier filing date and right of priority to Korean Application No. 10-2010-0089688, filed on Sep. 13, 2010, the contents of which is incorporated by reference herein in its entirety.

BACKGROUND OF THE INVENTION

1. Field of the Invention

The present invention relates to image composing of a mobile terminal, and more particularly, to a mobile terminal for composing three-dimensional (3D) images each having a different convergence point, and a method for composing 3D images thereof.

2. Description of the Related Art

A mobile terminal may be configured to perform diverse functions. Such diverse functions may include a data and voice communication function, a function of capturing a photo image or video through a camera, a voice storage function, a music file reproducing function through a speaker system, an image or video display function, and the like. Some mobile terminals include an additional function allowing playing games, and other mobile terminals are implemented as multimedia players. Recently, mobile terminals allow users to receive broadcast or multicast signals to view video or television programs.

Efforts are ongoing to support and increase the functionality of mobile terminals. Such efforts include software and hardware improvements, as well as changes and improvements in the structural components which form the mobile terminal.

A touch function of mobile terminals allows for users, who are not familiar to a button/key input, to conveniently operate terminals by using a touch screen. Recently, the touch function is settling as an important function of mobile terminals along with a user interface, as well as allowing for a simple input. Thus, as the touch function is applied in various forms to mobile terminals, development of a user interface (UI) fitting the various forms of touch function is increasingly required.

Recently, an interest in a 3D image is increasing and the tendency of producing contents by a 3D image in movies and TVs has been noticeable. A 3D image is formed by overlapping images (left and right images) captured by using two cameras, providing a three-dimensional effect to users.

The 3D image (pair of images) is captured according to different convergence zero points. Thus, due to the different convergence points, when users view an identical 3D image, respective objects of the 3D image are seen to be protruded or recessed at different degrees to the users. Namely, the 3D image has different disparities.

Thus, in case of composing one or more 3D images, a convergence point and disparity of a background image and an object image combined to the background image must be taken into consideration.

However, currently, 3D image composing mostly relies on the difference of images users feel by intuition, having a difficulty in providing an accurate, natural 3D effect.

SUMMARY OF THE INVENTION

An aspect of the present invention provides a mobile terminal capable of composing a plurality of 3D images each having a different convergence point, and a method for composing 3D images thereof.

Another aspect of the present invention provides a mobile terminal capable of providing guidance information for composing images to a user according to a convergence point and disparity, and a method for composing 3D images thereof.

According to an aspect of the present invention, there is provided a method for composing 3D images of a mobile terminal, including: selecting a background image as a reference from an image buffer; adjusting a convergence point of the selected background image; extracting an object image to be composed to the background image; displaying guidance information indicating a position at which the object image can be composed to the background image; and composing the object image to the background image according to the guidance information.

The guidance information may include an arrow or an area indication.

The composing of the images may include: composing the background image and the object image such that a disparity map of the background image and that of the object image are consistent; and adjusting the position of the object image according to the guidance information and composing the background image and the object image.

According to another aspect of the present invention, there is provided a mobile terminal including: a memory configured to store one or more 3D images; and a controller configured to display guidance information indicating a position at which an object image can be composed to a background image when the background image and the object image are selected from the memory, and compose the selected object image and the background image at the position according to the guidance information.

The controller may adjust a convergence point of the background image such that a convergence of a particular object image of the background image becomes 0.

When the background image is selected, the controller distinguishably displays an object whose convergence point is 0, an object whose convergence point can become 0, and an object whose convergence point cannot become 0.

The guidance information may include an arrow and an area indication.

The controller may compose the background image and the object image such that a disparity map of the background image and that of the object image are consistent, and adjust the position of the object image according to the guidance information to compose the background image and the object image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
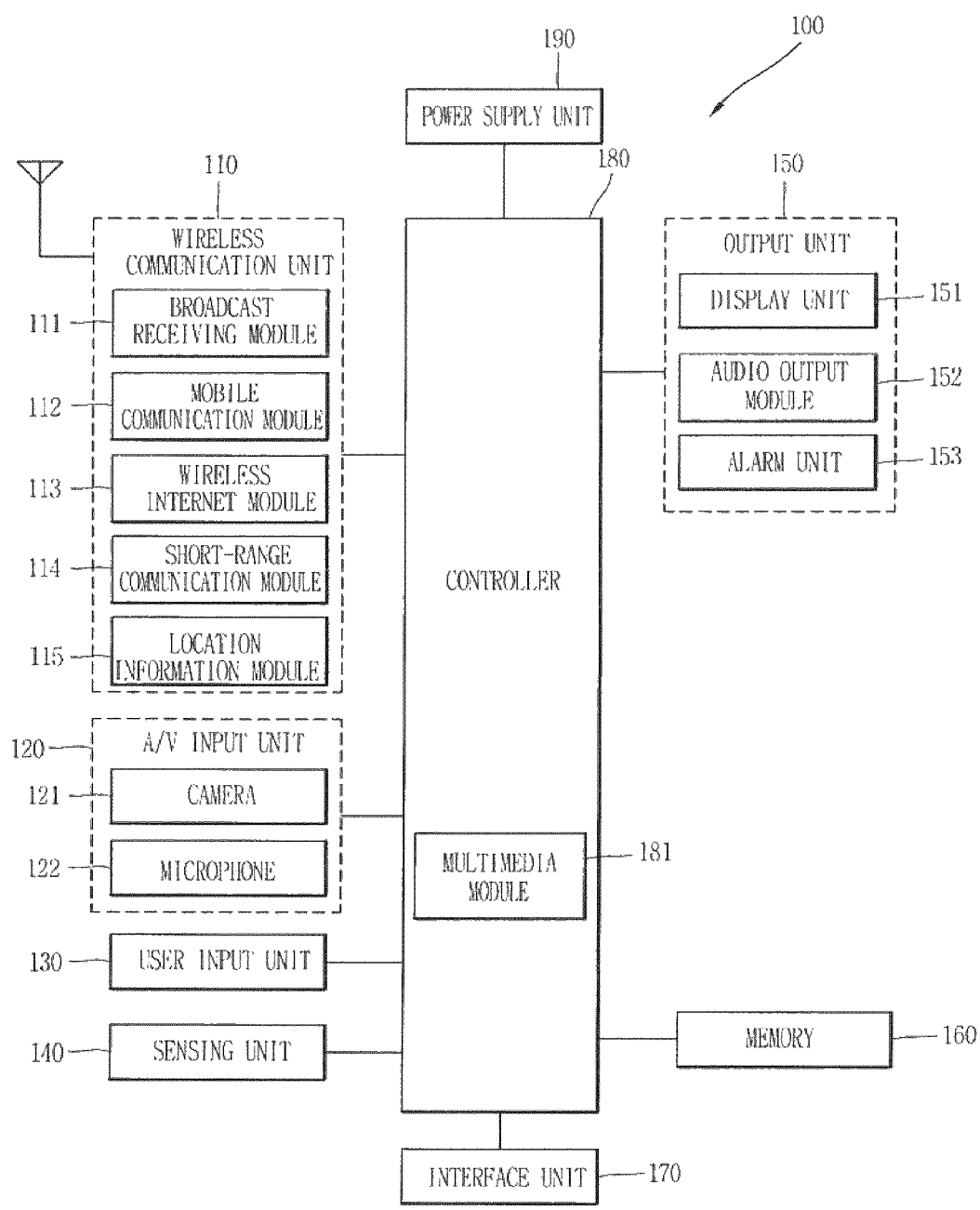
FIG. 1 is a schematic block diagram of a mobile terminal related to an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

Also, the sensing unit 140 includes a geomagnetic sensor that calculates a movement direction when the user moves, a gyro sensor that calculates a rotational direction, and an acceleration sensor that calculates a movement distance by multiplying one step to the strides of the user.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

In addition, when the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may be operated as a signal for recognizing that the mobile terminal is accurately mounted on the cradle.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

Also, the display unit 151 may be configured as a stereoscopic display unit displaying a stereoscopic image.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit may employ a 3D display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit by a stereoscopic processing unit. The stereoscopic processing unit may receive the 3D image and extract the left image and the right image, or may receive the 2D image and change it into a left image and a right image.

When a touch sensor is overlaid on the stereoscopic display unit in a layered manner, or when the stereoscopic display unit and a 3D sensor sensing a touch operation are combined, the stereoscopic display unit may also be used as a 3D input device.

As examples of the 3D sensor, the sensing unit 140 may include a proximity sensor, a stereoscopic touch sensing unit, an ultrasonic sensing unit, and a camera sensing unit.

The proximity sensor 141 detects the distance between a sensing object (e.g., the user's finger or a stylus) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit is configured to detect the strength or duration of a touch applied to the touch screen.

The ultrasonic sensing unit is configured to recognize position information of the sensing object by using ultrasonic waves. The ultrasonic sensing unit may include, for example, an optical sensor and a plurality of ultrasonic sensors.

The optical sensor is configured to sense light. For example, light may be ultraviolet rays, and the optical sensor may be an infrared port (Infrared data association (IRDA).

The ultrasonic sensors may be configured to sense ultrasonic waves. The plurality of ultrasonic sensors are disposed to be spaced apart, and accordingly, the plurality of ultrasonic sensors have a time difference in sensing ultrasonic waves generated from the same position or an adjacent position.

Ultrasonic waves and light are generated from a wave generation source. The wave generation source is provided in the sensing object, e.g., the stylus, or the like. Since light is even faster than ultrasonic waves, time for light to arrive at the optical sensor is even shorter than time for ultrasonic waves to arrive at the ultrasonic sensor. Thus, the position of the wave generation source can be calculated by using a time difference from the time for ultrasonic waves to arrive by using light as a reference signal.

The camera sensing unit includes at least one of a camera, a photo sensor, and a laser sensor. For example, the camera and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. Also, the memory 160 may store data regarding various patterns of vibrations and audio signals outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. The mobile terminal related to the present invention will be described in terms of components according to the external appearance of the mobile terminal with reference to FIGS. 2 and 3. Hereinafter, a slide-type mobile terminal, among various types of mobile terminal such as folder-type, bar-type, swing-type, slide type mobile terminals, or the like, will be described as an example for the sake of brevity. Thus, the present invention can be applicable to any type of mobile terminals, without being limited to the slide-type mobile terminal.

The mobile terminal 100 as shown in FIG. 1 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 2.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 2:
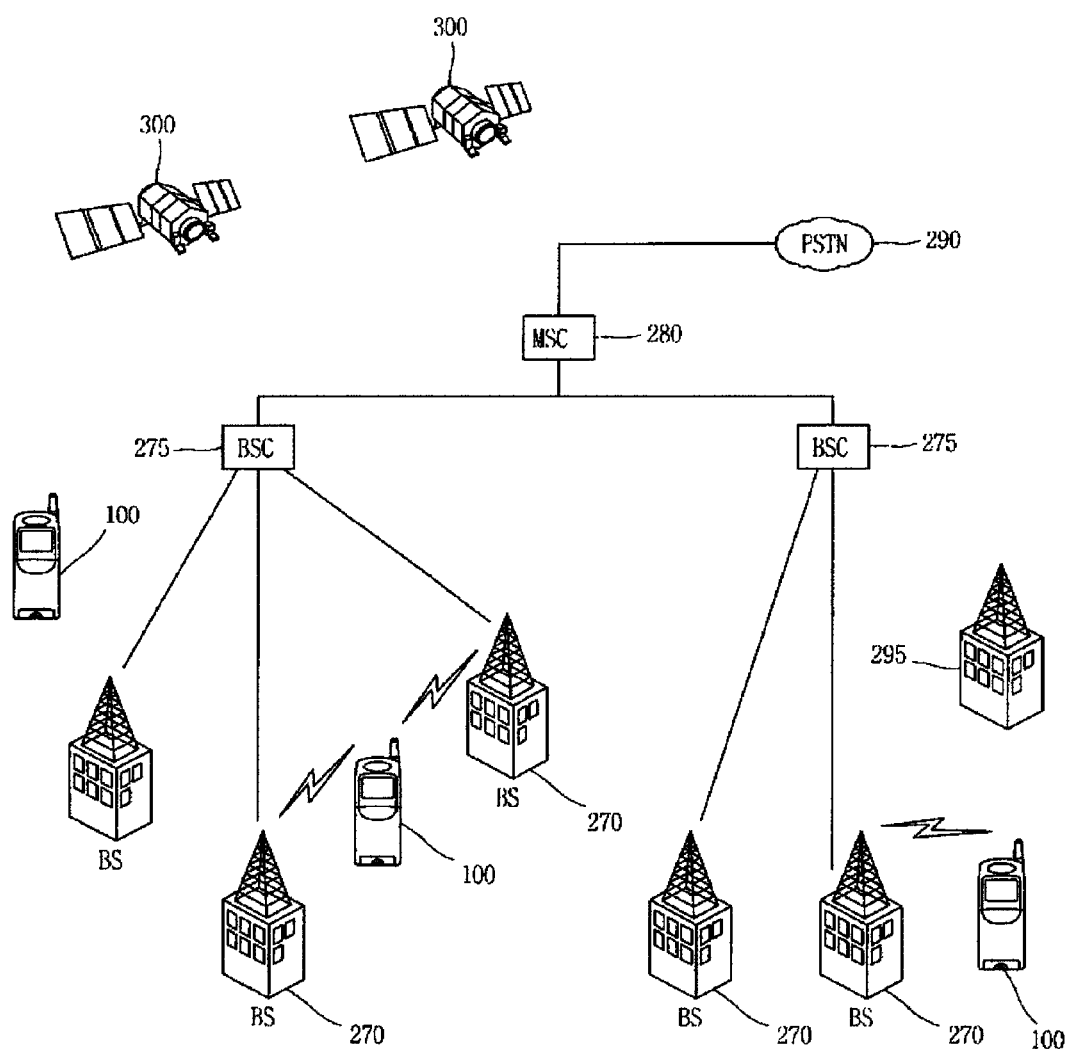
FIG. 2 is a block diagram of a wireless communication system with which the mobile terminal according to an embodiment of the present invention is operable.

Referring to FIG. 2, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 2 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 2, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 2, several global positioning systems (GPS) satellites 300 are shown. The satellites 300 help locate at least one of a plurality of terminals 100. In FIG. 2, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

3D Stereoscopic Image

In general, a 3D stereoscopic image (referred to as a '3D image', hereinafter) is an image refers to an image making a viewer feel that a gradual depth and reality of an object on the monitor is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The 3D image may be displayed according to a stereoscopic scheme (a glass scheme), an auto-stereoscopic scheme (glassless scheme), a projection scheme (holographic scheme), or the like. A stereoscopic scheme is commonly used for home television receivers, or the like, and includes a Wheatstone stereoscopic scheme, or the like. The auto-stereoscopic scheme, which is commonly used for mobile terminals, or the like, includes, for example, a parallax barrier scheme and a lenticular scheme. The projection scheme includes a reflective holographic scheme, a transmissive holographic scheme, or the like.

Generation and Displaying 3D Image

In general, a 3D stereoscopic image is comprised of a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Depth of 3D Image

Depth (or a depth value) of a 3D image refers to an index indicating the difference in a 3D distance among objects within the image. The depth is defined to have 256 levels (a maximum value of 255 to a minimum value), and as the depth has a higher value, it indicates to be closer to the user. Thus, adjusting of the depth in the 3D image means that when the 3D image is displayed to have the original size, the 3D image is displayed to have the original depth, and when content thereof is displayed as a small image, the 3D image is adjusted to have a depth level lower than that of the original depth.

For example, on the assumption that the depth is defined to have 256 levels and the maximum value is 255 and the minimum value is 0, when the 3D image is displayed to have the original size, the depth is adjusted to be 255, and when the 3D image is displayed to have a smaller size, the depth is adjusted to have a value smaller than 255.

In general, a 3D image has different disparity according to the pair of composed images. Disparity, which refers to a visual difference between images, generally includes binocular disparity making an object viewed differently according to observation positions, and crosstalk generated due to unnecessary interface between left and right images. Disparity generally indicates the degree of projection (disparity−) and the degree of depression (disparity+) in a 3D image.

Figure 3:
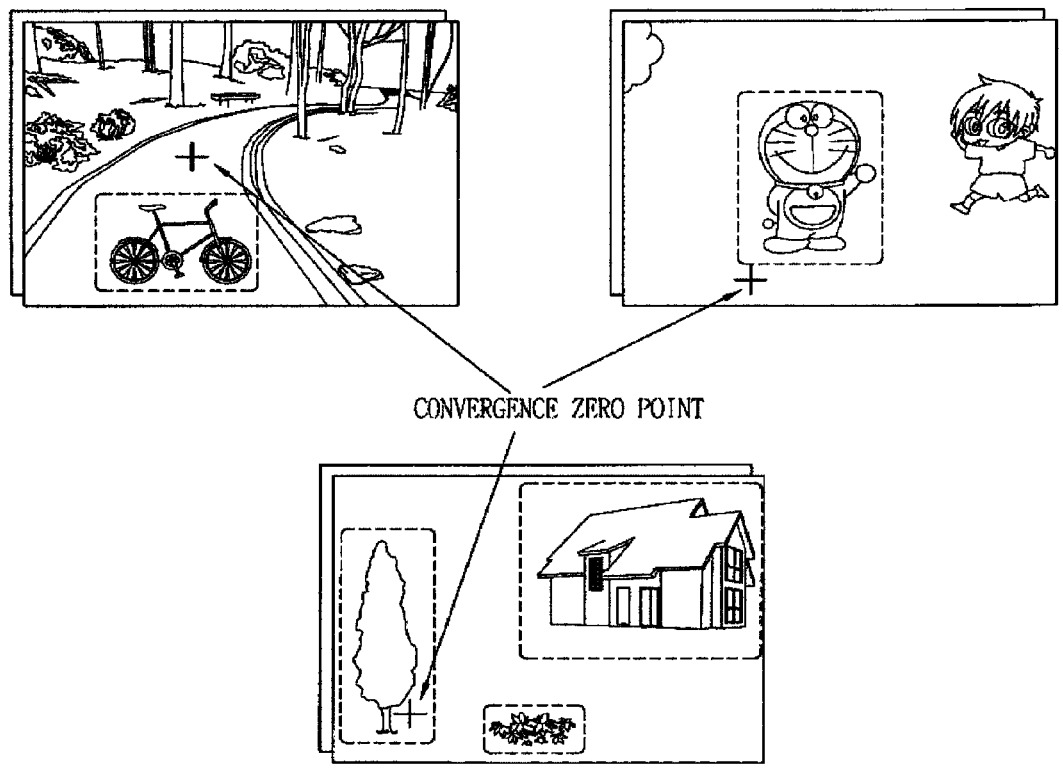
FIG. 3 is a view showing pairs of images (photo images) captured according to different convergence points by using a 3D camera.

FIG. 3 is a view showing pairs of images (photo images) captured according to different convergence points by using a 3D camera.

As shown in FIG. 3, the respective pairs of images have a different convergence zero point, so they have a different disparity. Namely, the objects, namely, a bicycle is seen to be projected and 'Doraemong' is seen to be depressed. Here, the convergence zero point refers to a point making an object to be seen to be projected to depressed.

The present invention proposes a method of composing a plurality of 3D images each having a different convergence (zero) point. In particular, the present invention provides a method for guiding a composition position of an object to be composed to a background image according to a section of the background image and a convergence point of the background image, and adjusting the composition position.

Selection of Background Image 3D images are composed by a 3D image editor.

When the 3D image editor is driven, the user may select a 3D image composition menu and select a background 3D image (referred t as a 'background image', hereinafter) as a reference among the several 3D images as shown in FIG. 3.

Figure 4:
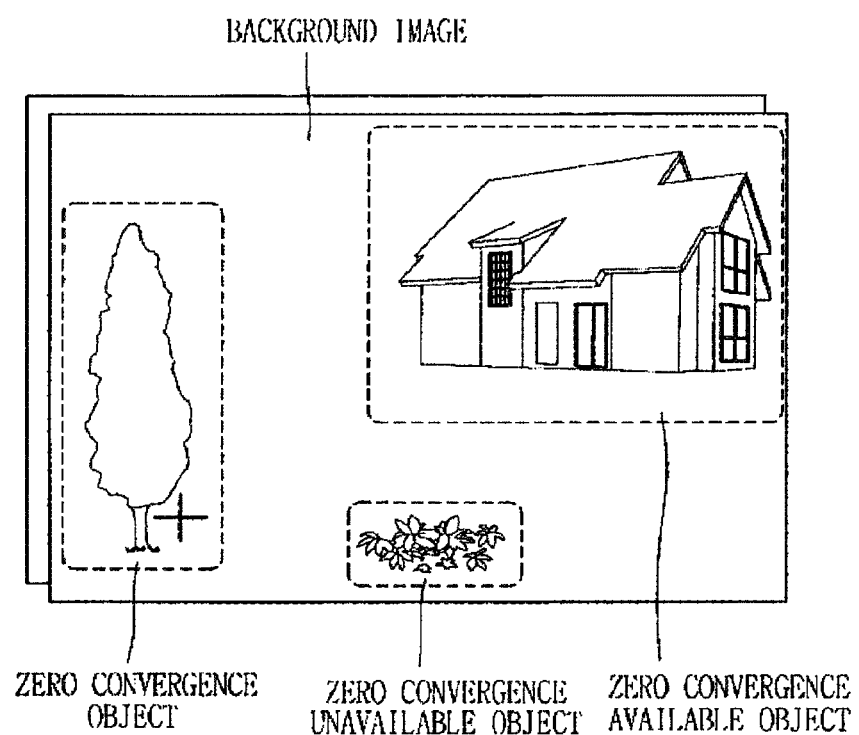
FIG. 4 is a view showing an example of a background image selected from an image buffer.

FIG. 4 is a view showing an example of a background image selected from an image buffer.

When the background image is selected, the convergence of the background image is adjusted. Namely, when the certain background image is selected, an object whose convergence point is currently 0 and an object whose convergence point may become 0 are distinguishably displayed (in different colors).

When the user selects the object whose convergence point becomes 0 (i.e., a zero convergence available object), the controller 180 adjusts the pair of overlapping images to make the corresponding object have a convergence 0. Here, the size of the 3D image having the adjusted convergence may be reduced. In case in which the object selected by the user cannot have a convergence 0, the controller 180 informs the user that the corresponding object is unavailable for zero convergence.

Thereafter, the left and right 3D images are compared based on the selected object having the convergence 0 to generate a disparity map vertically and store the same in the buffer. The disparity map is to indicate depth information in a 3D image, which is generated by a disparity map generator. Here, the disparity map generator generates the disparity map of the 3D image by using a correlation-based method and a characteristic-based method.

Selection of Object Image to be Composed

When the adjustment of the convergence of the background image is completed, an object image to be composed to the background image is extracted. The user may extract an object (or area) to be composed to the background image from the 3D images illustrated in FIG. 3, and the extracted object is stored in the image buffer. The extracted object image is stored as a pair of images in the buffer in order to maintain the convergence point of the original 3D image (i.e., to maintain the 3D effect). At this time, the disparity map generator generates a disparity map of the object image stored in the buffer and stores it in the buffer.

Figure 5A:
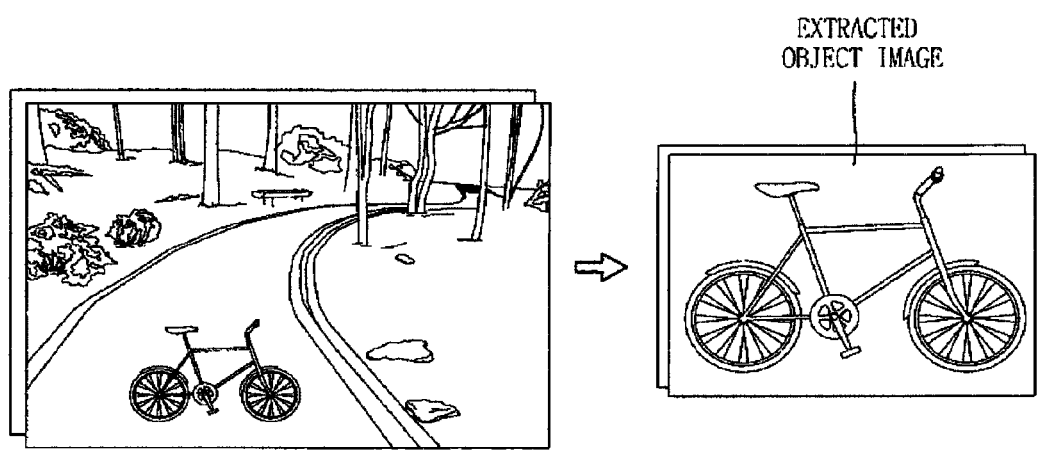
FIGS. 5A and 5B are views examples of extracting object images from 3D images.
Figure 5B:
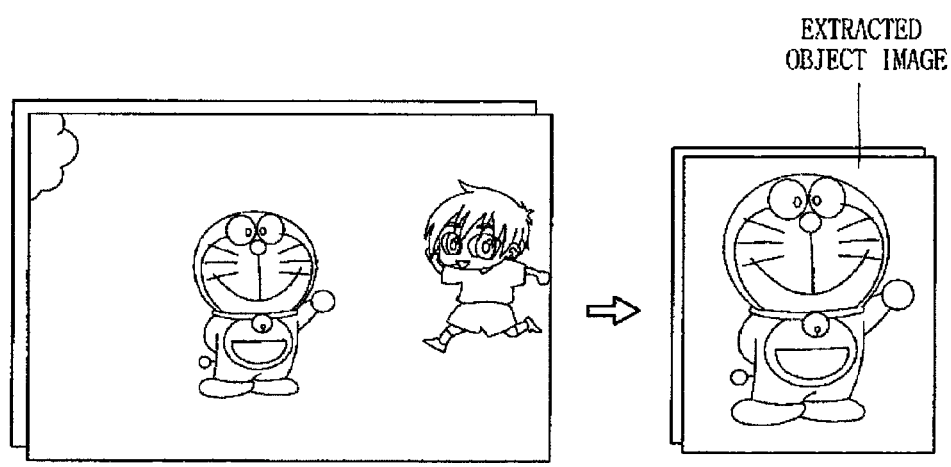
Figure 5C:
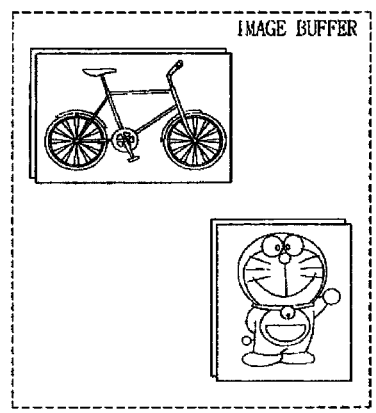
FIG. 5C is a view showing an example of storing an object image extracted from a 3D image in the image buffer.

FIGS. 5A and 5B illustrate examples of extracting 'bicycle' and 'Doraemong' from the respective 3D images, respectively, and FIG. 5C illustrates an example of storing the extracted images of 'bicycle' and 'Doraemong' in the image buffer.

Image Composition

Figure 6:
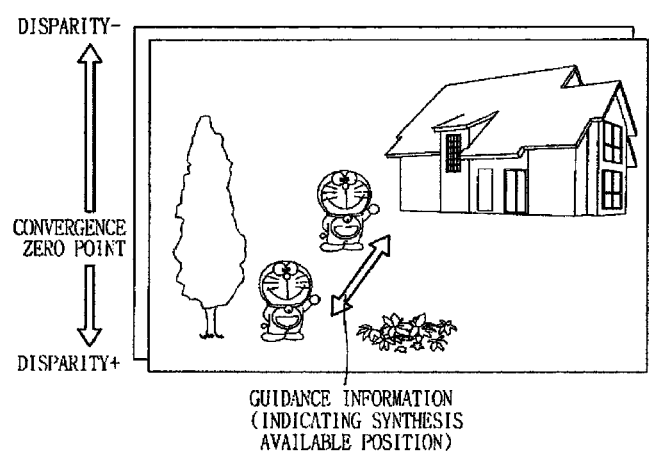
FIG. 6 is a view showing an example of composing a background image and an object image according to an embodiment of the present invention.

FIG. 6 illustrates an example of composing a background image and an object image.

As shown in FIG. 6, when a background image, an object image to be composed to the background image, and respective disparity maps are stored in the buffer, the objects extracted from the respective 3D images are composed to the background image. In this case, the image composition is performed such that the disparity map of the background image and that of the object image are consistent.

The controller 180 calculates a maximum disparity of the objects to be composed to display guide information indicating a position (a composition position) at which the object images can be composed to the background image. The guide information includes an arrow, an area indication, or the like.

When the user adjusts the position of the object image to be composed based on the guide information, the controller 180 adjusts the degree of overlapping of the left and right images stored in the image buffer such that the disparity map of the object image is consistent with the disparity map of the background image.

Figure 7:
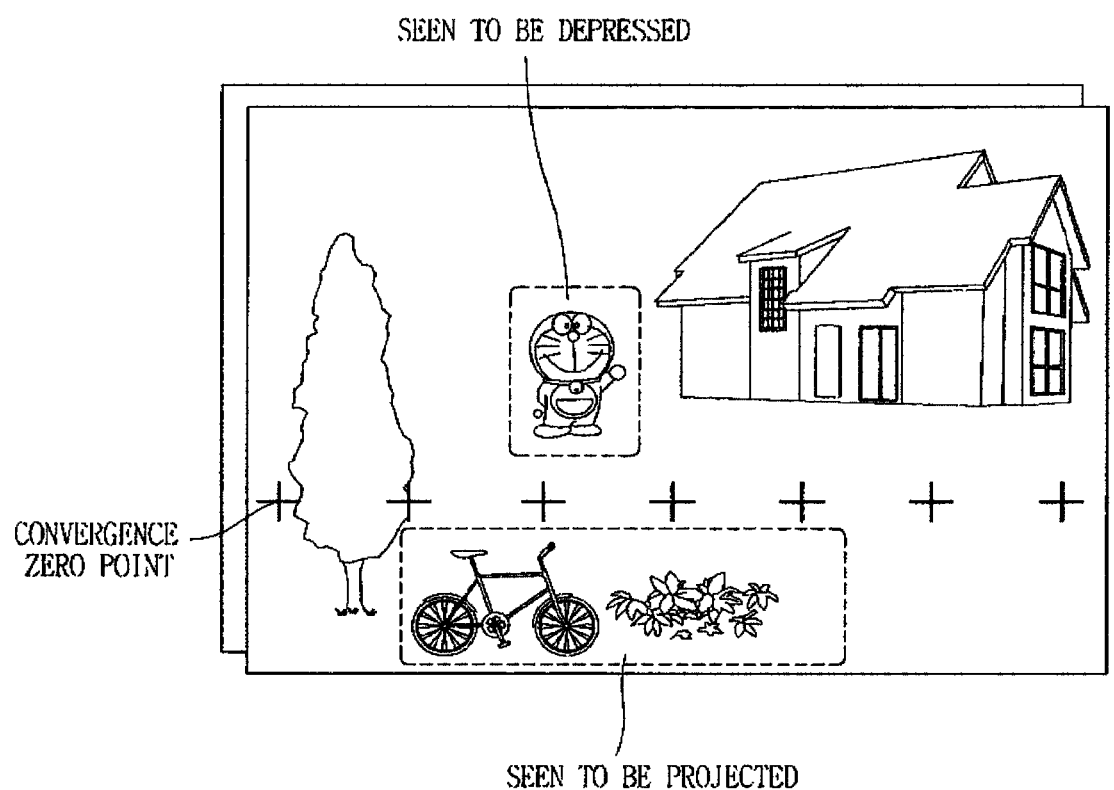
FIG. 7 is a view showing a new 3D image generated by composing a background image and an object image according to an embodiment of the present invention.

FIG. 7 shows a new 3D image generated by composing the background image and the object image according to an embodiment of the present invention.

The new 3D image generated by composing the background image and the object image is stored in the form of a profile in the image buffer, and when the user selects a particular profile, a convergence zero point and an object in a depressed or projected form, as well as a 3D image, are visually displayed.

Figure 8:
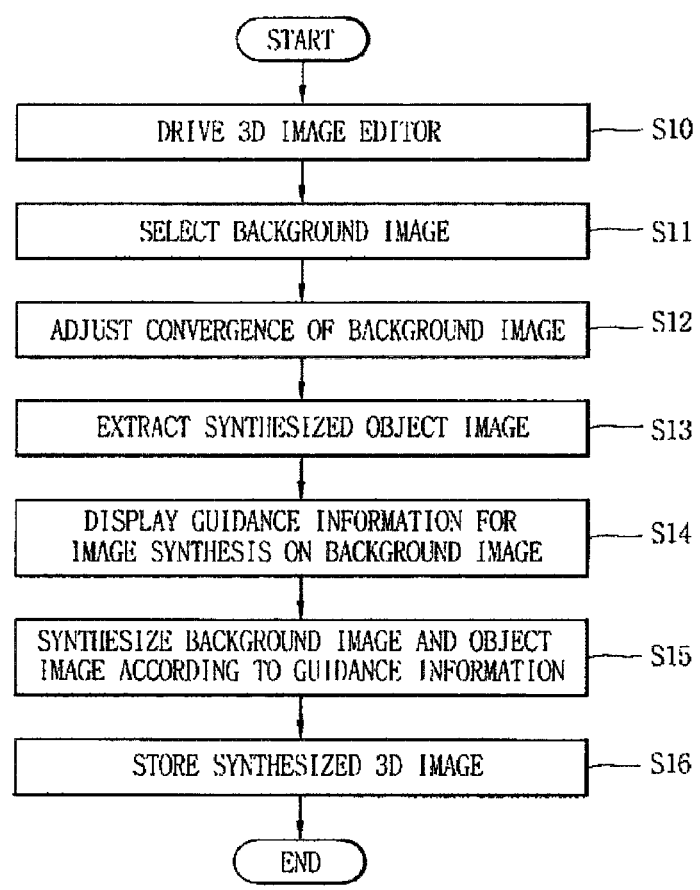
FIG. 8 is a flow chart illustrating the process of a method for composing 3D images of a mobile terminal according to an embodiment of the present invention.

FIG. 8 is a flow chart illustrating the process of a method for composing 3D images of a mobile terminal according to an embodiment of the present invention.

As shown in FIG. 8, in order to compose 3D image, a 3D image editor or a 3D image composition application is executed (S10).

The user enters a 3D image composition menu and selects a 3D image to be used as a reference background image from the image buffer (S11). When a particular background image is selected, the controller 180 distinguishably displays an object whose convergence point is currently 0 and an object whose convergence point may become 0 in the background image. Thus, the user can adjust the convergence points of the objects of the background image (S12).

For example, when the user selects an object whose convergence point can become 0 (zero convergence available object), the controller 180 adjusts a pair of overlapping images such that the convergence of the corresponding object becomes 0. Here, the size of the 3D image having the adjusted convergence may be reduced. Also, when the convergence of the object selected by the user cannot become 0, the controller 180 informs the user that the corresponding object is a zero convergence unavailable object.

When the adjustment of the convergence of the background image is completed, the user selects or extracts an object (or area) to be composed to the background image in the 3D from the 3D images illustrated in FIG. 3 (S13). The selected or extracted object image is stored in the buffer.

Thereafter, the user composes the extracted object image to the background image as a reference in a composition menu. According to a user's image composition input, the controller 180 composes the background image and the extracted object image such that the disparity map of the background image and that of the object image are consistent. The controller 180 calculates a maximum disparity of the object to be composed and display guidance information indicating a position (or area) at which the object image can be composed to the background image. The guidance information includes an arrow, an area indication, or the like.

Thus, the user places the object image at the indicated position (or area) where composing can be performed to compose the object image to the background image. When the user adjusts the position of the object image, the controller 180 adjusts the overlapping degree of the left and right images of the image buffer such that the disparity map of the object image is consistent with that of the background image.

The composed 3D image is stored in the form of a profile in the image buffer (S16). Thereafter, when the user selects a particular profile, a convergence zero point and an object in a depressed or projected form, as well as a 3D image, are visually displayed.

As described above, in the embodiments of the present invention, when the 3D images having a different convergence point are composed, the convergence point of the background image is adjusted and the guidance information indicating a position at which the object image is to be composed is provided. Thus, 3D composition can be performed conveniently and accurately.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for composing 3D images of a mobile terminal, the method comprising:
    selecting a first image from an image buffer as a reference background image in response to a first input;
    adjusting a convergence point of the reference background image;
    extracting an object image from a second image in response to a second input, the object image to be included with the reference background image;
    displaying guidance information to a user indicating a position at which the object image can be included with the reference background image such that a disparity map of the reference background image and a disparity map of the object image are consistent; and
    adjusting a position of the object image relative to the reference background image in response to a third input.

2. The method of claim 1, wherein adjusting the convergence point of the reference background image comprises adjusting the reference background image such that a convergence value of a second object image of the reference background image becomes 0.

3. The method of claim 1, further comprising displaying an indication when the the second object image of the reference background image is not able to be adjusted to have a convergence value of 0.

4. The method of claim 1, further comprising distinctly displaying:
- a second object image of the reference background image having a convergence value of 0,
- a third object image of the reference background image which can be adjusted to have a convergence value of 0, and
- a fourth object image of the reference background image which cannot be adjusted to have a convergence value of 0.

5. The method of claim 1, wherein the guidance information includes at least an arrow indicating the direction in which to adjust the object image or a location indicator indicating the position to which to move the object image.

6. The method of claim 1, further comprising:
- storing the disparity map of the reference background image and the disparity map of the object image.

7. The method of claim 1, further comprising:
- adjusting a degree of overlap between a left image and a right image of the object image stored in the image buffer such that the disparity map of the object image is consistent with disparity map of the reference background image when a user adjusts the position of the object image.

8. A mobile terminal comprising:
- a display configured to display information;
- a memory configured to store one or more 3D images; and
- a controller configured to:
  - select a first image of the one or more 3D images as a reference background image in response to a first input;
  - extract an object image from a second image of the one or more 3D images in response to a second input;
  - cause the display to display guidance information indicating a position at which the object image can be included with the reference background image such that a disparity map of the object image and a disparity map of the reference background image are consistent; and
  - position the object image on the reference background image according to a third input.

9. The mobile terminal of claim 8, wherein the controller is further configured to adjust a convergence point of the reference background image such that a convergence value of a second object image of the reference background image becomes 0.

10. The mobile terminal of claim 8, wherein the controller is further configured to cause the display to distinctly display:
- a second object image of the reference background image having a convergence value of 0,
- a third object image of the reference background image which can be adjusted to have a convergence value of 0, and
- a fourth object image of the reference background image which cannot be adjusted to have a convergence value of 0.

11. The mobile terminal of claim 8, wherein the guidance information includes at least an arrow indicating the direction in which to adjust the object image or a location indicator indicating the position to which to move the object image.

12. The mobile terminal of claim 8, wherein the mobile terminal further comprises:
- an image buffer configured to store the object image; and
- a disparity map generator configured to generate a disparity map of the object image stored in the image buffer and a disparity map of a second object image for which adjustment of a convergence point was completed.

13. The mobile terminal of claim 8, wherein the controller is further configured to adjust a degree of overlap between a left image and a right image of the selected object image stored in the image buffer such that a disparity map of the object image is consistent with a disparity map of the reference background image.

* * * * *